(12) United States Patent
Franklin

(10) Patent No.: US 6,694,741 B2
(45) Date of Patent: Feb. 24, 2004

(54) ELECTRONIC ENGINE SYNCHRONIZER

(75) Inventor: Michael E. Franklin, Mudgeeraba (AU)

(73) Assignee: Cummins, Inc., Columbus, IN (US)

( * ) Notice: Subject to any disclaimer, the term of this patent is extended or adjusted under 35 U.S.C. 154(b) by 75 days.

(21) Appl. No.: 09/954,365

(22) Filed: Sep. 17, 2001

(65) Prior Publication Data

US 2003/0051477 A1 Mar. 20, 2003

(51) Int. Cl.$^7$ ................................................ F01B 21/04
(52) U.S. Cl. .............................. 60/709; 60/706; 60/711
(58) Field of Search ......................... 60/698, 700, 702, 60/711, 706, 709, 710

(56) References Cited

U.S. PATENT DOCUMENTS

| | | |
|---|---|---|
| 3,986,363 A | 10/1976 | Beaman et al. |
| 4,479,357 A | 10/1984 | Stewart |
| 4,505,347 A | 3/1985 | Prechtel |
| 4,560,021 A | 12/1985 | Yamakawa |
| 4,649,708 A | 3/1987 | Fisher |
| 4,741,165 A | 5/1988 | Kobus |
| 4,771,838 A | 9/1988 | Ketcham |
| 4,964,276 A | 10/1990 | Sturdy |
| 5,004,962 A * | 4/1991 | Fonss et al. .................. 318/85 |
| 5,291,410 A | 3/1994 | Metz |
| 5,330,020 A | 7/1994 | Ketcham |
| 5,771,860 A | 6/1998 | Bernardi |
| 5,890,365 A | 4/1999 | Sisti |
| 6,186,925 B1 | 2/2001 | Bellinger |
| 6,517,396 B1 * | 2/2003 | Into ............................ 440/84 |

OTHER PUBLICATIONS

"Surface Vehicle Recommended Practice"; The Engineering Society For Advancing Mobility Land Sea Air and Space; SAE # J1939–21; Issued Dec. 1994; Rev. Dec. 1997.
"Surface Vehicle Recommended Practice"; The Engineering Society For Advancing Mobility Land Sea Air and Space; SAE # J1939–21; Issued Jul. 1994; Rev. Jul. 1998.

* cited by examiner

Primary Examiner—Hoang Nguyen
(74) Attorney, Agent, or Firm—Barnes & Thornburg

(57) ABSTRACT

A control system for use with a master engine and one or more slave engines. The master engine produces a master torque and the slave engines produce slave torques. The master engine and the slave engines have computers that control fueling to the engines. The control system of the invention includes an interface between the control computer for the master engine and the control computers for the slave engines. The master control computer controls the slave control computers through the interface, such that the slave torques are a function of the master torque.

27 Claims, 5 Drawing Sheets

ELECTRONIC ENGINE SYNCHRONIZER

FIELD OF THE INVENTION

This invention relates generally to control area networks (CANs) for managing the operation of internal combustion engines, and more specifically to systems for synchronously controlling a plurality of such engines. The invention is disclosed in the context of a multiple trailer road train vehicle, but is believed to be useful in other applications as well.

BACKGROUND OF THE INVENTION

In some internal combustion engine applications, the required power output to drive a load exceeds the capability of a single engine and drive train combination. Some examples of such applications are generator sets, boats having twin propulsion screws, multi-engine aircraft, and multiple trailer road train vehicles. For these and other applications, engine synchronization systems are known in the art. For example, a mechanical device for synchronizing marine engines is described in the Herbert U.S. Pat. No. 3,258,927 granted Jul. 5, 1966, herein incorporated by reference. In the Sturdy U.S. Pat. No. 4,964,276 granted Oct. 23, 1990, herein incorporated by reference, an electronic synchronizer is described for controlling the speed of a second engine to maintain it in synchronism with a master speed signal from a first engine. In the Bernardi U.S. Pat. No. 5,771,860 granted Jun. 30,1998, herein incorporated by reference, another electronic synchronizer is described for controlling the power output from a second engine as a function of three variables. The three variables are the inlet manifold pressure of a first engine, the inlet manifold pressure of the second engine, and a signal produced by an offset potentiometer that compensates for minor differences between the manifold-pressure-to-power-output ratios of the two engines.

Most prior art systems designed to synchronize a plurality of engines involve monitoring the speed of a master engine and adjusting the speed of one or more slave engines to match the speed of the master engine. For engines driving a common load, control based on engine speed only functions properly if the engines and drive trains are identical. That is, at any engine speed, the torque output by each engine to the driven member (wheels, drive shaft, screw, etc.) must be the same. While these engine speed-based control methods are adequate for controlling identical engines, they do not provide a user with the ability to control engines having differing power and torque characteristics and drive-train configurations.

One method of synchronizing engines which does not use engine speed as the controlling parameter is shown in Bernardi. In the Bernardi patent, a system is disclosed for synchronizing the power output of two mechanically-linked engines, where the first engine transmits mechanical power through a shaft to the second engine, and the second engine transmits mechanical power to a load, such as an electrical generator. However, as summarized above, the disclosed method adjusts the throttle of a second engine as a function of the inlet manifold pressures of the two engines; the controller attempts to maintain equal manifold pressures in the two engines. This system assumes manifold pressure is a proxy for power output and engine speed. This assumption is only valid if the engines are identical, or near enough to identical that the disclosed offset potentiometer may compensate for the difference.

While these and other prior art systems generally perform adequately for the applications for which they are designed, they do not provide a means for controlling engines having differing power output and torque output characteristics, so that the engines may be adapted to drive a common load.

SUMMARY OF THE INVENTION

According to one aspect of the invention, a control system is provided for use with at least a first engine producing a first torque and second engine producing a second torque. The control system comprises an interface between a first control computer associated with the first engine and a second control computer associated with the second engine. The first control computer is configured to control the second control computer through the interface such that the second torque is a function of the first torque.

Illustratively according to this aspect of the invention, the first engine has a first maximum torque output associated therewith. The interface receives a first percent torque message indicating a first percentage that equals the first torque divided by the first maximum torque. The interface generates a torque request message indicating a requested torque value indicating a requested torque to be produced by the second engine that is a function of the first percentage, and transmits the torque request message to the second control computer.

Further illustratively according to this aspect of the invention, the second engine has a second maximum torque output associated therewith. The interface receives a second percent torque message indicating a second percentage that equals the second torque divided by the second maximum torque output. The requested torque value is further a function of the second percentage.

Alternatively illustratively according to this aspect of the invention, the interface receives a first message indicating a first value from the first control computer and a second message indicating a second value from the second control computer. The interface calculates an error value indicating the difference between the first and second values. The interface utilizes this error value to calculate a requested torque value indicating a requested torque to be produced by the second engine to cause the error value to approach zero.

Further illustratively according to this aspect of the invention, the interface transmits a torque request message indicating the requested torque value to the second control computer.

Additionally illustratively according to this aspect of the invention, the interface provides a torque request signal indicating the requested torque value to the second control computer.

Additionally illustratively according to this aspect of the invention, the first value indicates a percentage that equals the first torque divided by the first maximum torque output.

Additionally illustratively according to this aspect of the invention, the first value indicates a brake mean effective pressure produced by the first engine.

Alternatively illustratively according to this aspect of the invention, the first control computer is coupled to a first network. The second control computer is coupled to a second network. The interface is coupled between the first and second networks.

According to another aspect of the invention a control system is provided for synchronizing the operation of a plurality of internal combustion engines. The system comprises, a first control computer associated with a first internal combustion engine, the control computer producing a first datum. The system further comprises a second control computer associated with a second internal combustion engine. The system further comprises an interface operatively coupled between the first and second control computers. The interface is responsive to the first datum to provide an operational command to the second control computer. The second control computer is responsive to the operational command to control the second engine, so that a first relationship exists between a second torque produced by the second engine and a first torque produced by the first engine.

Additionally illustratively according to this aspect of the invention, the first internal combustion engine has a first maximum torque output associated therewith. The first datum indicates a first percentage that equals the first torque divided by the first maximum torque output.

Further illustratively according to this aspect of the invention, the second internal combustion engine has a second maximum torque output associated therewith. The second control computer produces a second datum indicating a second percentage that equals the second torque divided by the second maximum torque output. The interface is further responsive to the second datum to provide the operational command to the second control computer so that the first relationship is further a function of the second percentage.

Alternatively illustratively according to this aspect of the invention, the first datum indicates a first value. The second control computer produces a second datum indicating a second value. The interface is responsive to the first and second data to produce an error value indicating the difference between the first and second values. The interface calculates a requested torque value indicating a requested torque to be produced by the second internal combustion engine to cause the error value to approach zero.

Further illustratively according to this aspect of the invention, the operational command comprises a torque request message indicating the requested torque value.

Further illustratively according to this aspect of the invention, the operational command comprises a torque request signal indicating the requested torque value.

Further illustratively according to this aspect of the invention, the first engine has a maximum torque output associated therewith, and the first value indicates a percentage that equals the first torque divided by the maximum torque output.

Further illustratively according to this aspect of the invention, the first value indicates a brake mean effective pressure produced by the first engine.

Alternatively illustratively according to this aspect of the invention, the first control computer is coupled to a first network. The second control computer is coupled to a second network. The interface is coupled between the first and second networks.

Alternatively illustratively according to this aspect of the invention, the interface is operatively coupled to a selector having at least a first and a second state. The first relationship exists between the first torque and the second torque when the selector is in the first state. A second relationship exists between the first torque and the second torque when the selector is in the second state.

According to another aspect of the invention a slave control computer is provided for controlling a slave engine. The slave control computer comprises a first interface adapted to receive a datum from a master engine control computer associated with a master engine, and a second interface adapted to provide a fueling signal to a fueling system associated with the slave engine. The fueling system is responsive to the fueling signal to provide a quantity of fuel to the slave engine so that a second torque produced by the slave engine is related to a first torque produced by the master engine.

According to another aspect of the invention a master control computer for controlling a master engine. The master control computer comprises a first interface adapted to provide a fueling signal to a fueling system associated with the master engine. The fueling system is responsive to the fueling signal to provide a quantity of fuel to the master engine. The master control computer comprises second interface adapted to provide a datum to a slave control computer associated with a slave engine. The slave control computer is responsive to the datum to control the slave engine so that an output torque produced by the slave engine is related to an output torque produced by the master engine.

According to another aspect of the invention a control system is provided for use with at least a first engine producing a first torque and a second engine producing a second torque. The control system comprises a first control computer configured to compute a first fueling signal, a first fueling system responsive to the first fueling signal to supply a corresponding quantity of fuel to the first engine, a second control computer configured to compute a second fueling signal, a second fueling system responsive to the second fueling signal to supply a corresponding quantity of fuel to the second engine, and an interface operatively coupled between the first and second control computers. The interface is responsive to a first datum from the first control computer to provide an operational command to the second control computer. The second control computer is responsive to the operational command to compute the second fueling signal so that the second torque is a function of the first torque.

Illustratively according to this aspect of the invention, the first engine has a first maximum torque output associated therewith. The first datum indicates a first percentage that equals the first torque divided by the first maximum torque output.

Further illustratively according to this aspect of the invention, the second engine has a second maximum torque output associated therewith, the second control computer produces a second datum indicating a second percentage that equals the second torque divided by the second maximum torque output, and the interface is further responsive to the second datum to provide the operational command to the second control computer so that the second torque is further a function of the second percentage.

Alternatively illustratively according to this aspect of the invention, the first datum indicates a first value. The second control computer produces a second datum indicating a second value. The interface is responsive to the first and second data to produce an error value indicating the difference between the first and second values and to provide the operational command such that the error value approaches zero.

Further illustratively according to this aspect of the invention, the operational command is a torque request message.

Alternatively illustratively according to this aspect of the invention, the operational command is a torque request signal.

Alternatively illustratively according to this aspect of the invention the second engine has a second maximum torque output associated therewith, and the first value indicates a percentage that equals the first torque divided by the maximum torque output.

Alternatively illustratively according to this aspect of the invention, the first value indicates a brake mean effective pressure produced by the first engine.

Alternatively illustratively according to this aspect of the invention, wherein the first control computer is coupled to a first network, the second control computer is coupled to a second network, and the interface is coupled between the first and second networks.

According to another aspect of the invention, an apparatus is provided for controlling a first torque output of a first engine having a first electronic control module that produces a first control signal to control a first fueling system associated with the first engine, and a second torque output of a second engine having a second electronic control module that produces a second control signal to control a second fueling system associated with the second engine. The apparatus comprises an input port coupled to the first electronic control module to receive a reference datum from the first electronic control module, the reference datum correlating to the first torque output, a feedback port coupled to the second electronic control module to receive a feedback datum from the second control module, the feedback datum correlating to the second torque output, an output port coupled to the second electronic control module, and a controller coupled to the input, feedback, and output ports. The controller is responsive to the reference datum and the feedback datum to generate an output signal that is indicative of changes to be made to the at least one second control signal in order for the second torque output to match the first torque output. The controller transmits the output signal to the second electronic control module via the output port.

Illustratively according to this aspect of the invention, the controller is configured to subtract the feedback datum from the reference datum to produce a difference signal, and to process the difference signal to generate the output signal.

According to another aspect of the invention, a motor vehicle system is provided. The motor vehicle system comprises a tractor including a main engine, a first plurality of wheels, and a torque-request device coupled to the main engine. The torque-request device sends a torque-request signal to the main engine. The main engine operates to supply a first torque to at least one of the plurality of wheels to propel the vehicle in response to the torque-request signal. The motor vehicle system further comprises a trailer coupled to the tractor. The trailer includes an auxiliary engine and a second plurality of wheels. The auxiliary engine is operable to supply a second torque to at least one of the second plurality of wheels. The motor vehicle system further comprises a controller coupled to the main engine and coupled to the auxiliary engine. The controller receives from the main engine a first signal indicative of the first torque and from the auxiliary engine a second signal indicative of the second torque. The controller is configured to process the first and second signals and to produce a third signal indicative of changes to be made to the second torque so that the second torque is a function of the first torque. The controller provides the third signal to the auxiliary engine. The auxiliary engine is responsive to the third signal to modify the second torque.

According to another aspect of the invention, a method is provided for synchronizing a plurality of torque producing engines. The method includes receiving a first signal from a first control computer associated with a first engine, receiving a second signal from a second control computer associated with a second engine, processing the first and second signals to produce a third signal indicative of changes to be made to a second torque produced by the second engine so that the second torque is a function of a first torque produced by the first engine. The method further includes providing the third signal to the second control computer. The second control computer is responsive to the third signal to control the second engine such that a brake mean effective pressure of the second engine is a function of a brake-mean effective pressure of the first engine.

BRIEF DESCRIPTION OF THE DRAWINGS

The invention may best be understood by referring to the following detailed description and accompanying drawings. In the drawings.

DETAILED DESCRIPTION OF ILLUSTRATIVE EMBODIMENTS

Illustrative embodiments of a system for synchronizing operation of a plurality of internal combustion engines is herein described. The system is described as specifically adapted for use in a multiple trailer road train vehicle. It will be appreciated by those skilled in the art that the device is useful in applications and embodiments differing from the description that follows. Other applications to which the system can be easily adapted include generator sets, boats having twin propulsion screws, and the like.

Figure 1:
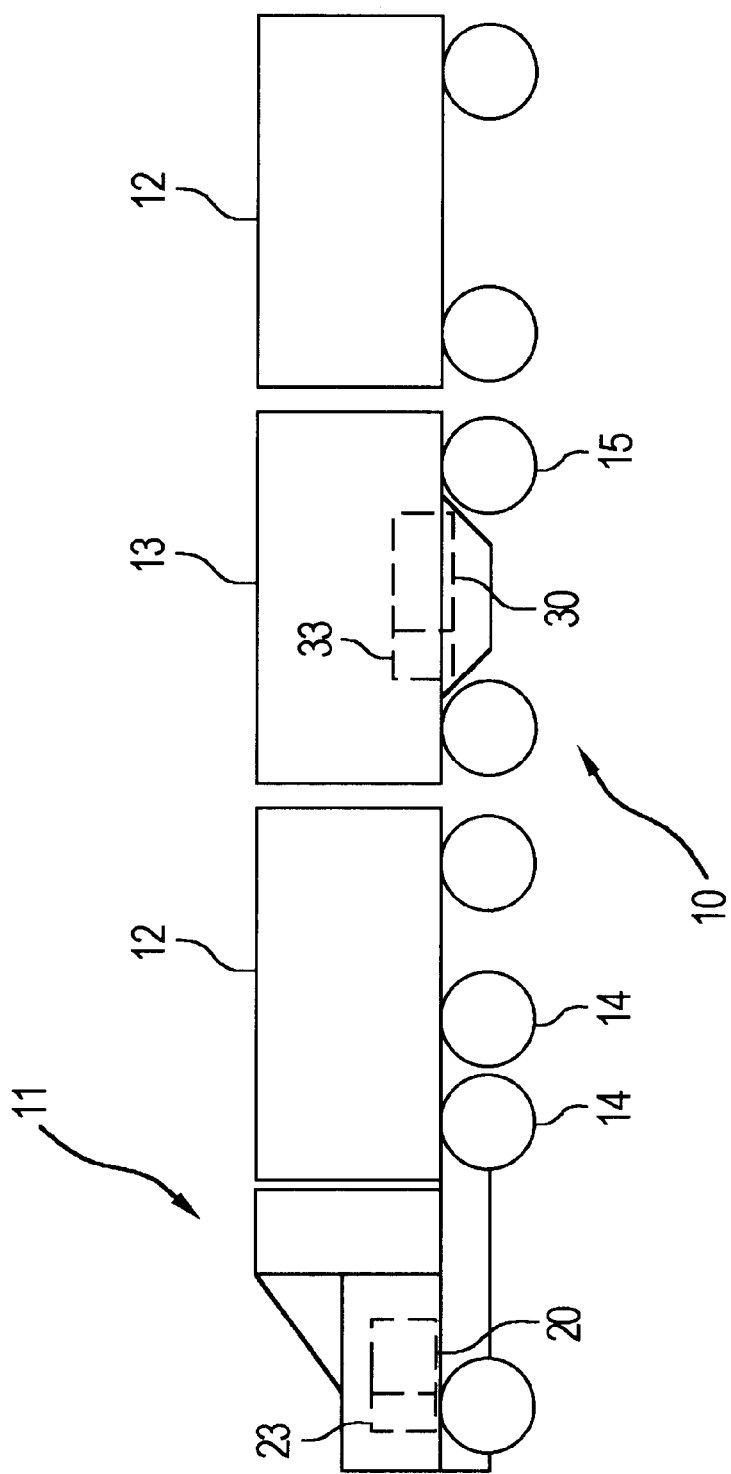
FIG. 1 illustrates a multiple trailer road train vehicle utilizing the present invention.

Referring now generally to FIG. 1, a multiple trailer road train vehicle 10 is shown including one preferred embodiment of the engine synchronization system of the present invention. Vehicle 10 includes: tractor 11, a plurality of passive trailers 12, and driven trailer 13. In this illustrative embodiment, the second trailer is depicted as driven trailer 13. However, any or all of the connected trailers could be driven trailers without departing from the scope of the present invention. Tractor 11 includes cab 16, drive train 20 and driven wheels 14. Drive train 20 includes engine 23 and any rotating components driven thereby including, but not limited to, one or more transmissions, propeller shafts, axles, wheels, and the like.

Driven trailer 13 includes drive train 30 and driven wheels 15. Similar to drive train 20, drive train 30 includes engine 33 and any rotating components driven thereby including, but not limited to, one or more transmissions, propeller shafts, axles, wheels, and the like. In this embodiment, engine 23 is the master engine, and engine 33 is the slave engine.

Figure 2:
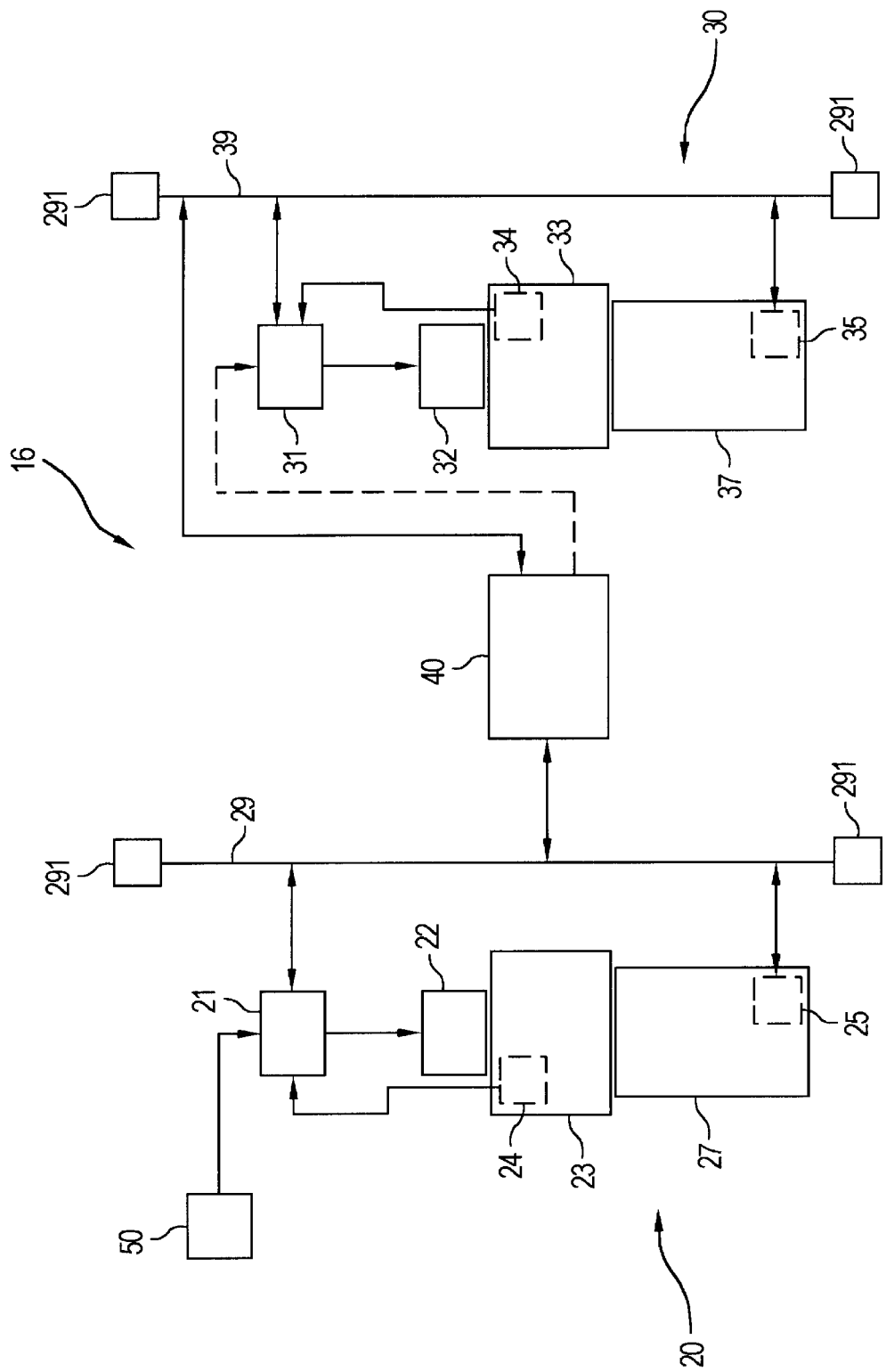
FIG. 2. is a structural block diagram illustrating one preferred embodiment of a system for synchronizing operation of a plurality of internal combustion engines, in accordance with the present invention.

Referring now generally to FIG. 2, a structural block diagram of one preferred embodiment of a system, designated generally as 16, for synchronizing operation of a plurality of internal combustion engines is shown. The main physical components of system 16 will be described, followed by a description of the control and communications functions implemented thereby. The network diagram shown in FIG. 2 is simplified in order to emphasize the portions the embodiment that are most directly related to the present invention. Those skilled in the art will recognize that a complete network diagram would comprise a tractor bus, multiple trailer subnetworks, one or more bridges, one or more proprietary subnetworks, and a plurality of network nodes.

In the embodiment illustrated in FIG. 2, drive train 20 includes engine 23 operatively coupled to transmission 27, as is well known in the art. In one preferred embodiment of drive train 20, transmission 27 is a known automated transmission having a number of automatically selectable gear ratios, and wherein shifting between the automatically selectable gear ratios of transmission 27 is controlled by an on-board control computer 25. However, it will be appreciated by those skilled in the art that transmission 27 may alternatively be a manual transmission, a manual-automatic hybrid transmission, or any other form of torque converter.

Engine 23 further includes fueling system 22 coupled thereto, wherein fueling system 22 may be an electronically controlled fueling system of known configuration. Control computer 21 for controlling and managing the overall operation of engine 23 may be one of many types of known control computers adapted for use with internal an combustion engine, which are often referred to as electronic control modules (ECMs). Control computer 21 is electronically connected to torque request mechanism 50 and to fueling system 22, wherein control computer 21 is responsive to at least a torque request signal produced by mechanism 50 to provide a fueling command to fueling system 22 in a manner well known in the art. Fueling system 22 is, in turn, responsive to the fueling command to supply fuel to engine 23. While torque request mechanism 50 is illustrated in FIG. 2 as an accelerator pedal of known construction, those skilled in the art will recognize that mechanism 50 may alternatively be another known torque request mechanism, such as a hand-controlled throttle, cruise control system, or the like.

Engine 23 includes engine speed sensor 24, which is operatively coupled to control computer 21. Engine speed sensor 24 is preferably a Hall-effect sensor operable to sense passage thereby of a number of teeth formed on a gear or tone wheel rotating synchronously with the crankshaft (not shown) of engine 23. Alternatively, sensor 24 may be a variable reluctance or other known sensor, and is in any case operable to provide an engine speed signal to control computer 21 indicative of rotational speed of engine 23.

Control computer 21 and transmission control computer 25 are operably coupled to network segment 29, as is known in the art, wherein segment 29 terminates at resistors 291.

Also coupled to network segment 29, and thereby operably coupled to control computer 21, is synchronizer 40.

Engine 33 includes engine speed sensor 34, which is of a known type, and which is operatively coupled in a similar manner as engine speed sensor 24. Also similarly, control computer 31 and transmission control computer 35 are operably coupled to network segment 39, wherein segment 39 terminates at resistors 291. Synchronizer 40 is coupled to network segment 39, and thereby operably coupled to control computer 31.

Regarding network segments 29 and 39, the Society of Automotive Engineers (SAE) Truck and Bus Control and Communications Subcommittee has developed a family of standards concerning the design and use of devices that transmit electronic signals and control information between vehicle components. These standards, known as SAE J1939, have become an accepted industry standard in heavy-duty vehicle control area network (CAN) design. A full description of the network layer of a J1939 compliant network is contained in the document "SAE 1939/31 (R) NETWORK LAYER". These standards are known to those skilled in the art. In one preferred embodiment, network segments 29 and 39 are J1939 compliant. Alternatively, network segments 29 and 39 could be any network configured for communication in accordance with a known communications protocol. Examples of such protocols include the SAE J1587 standard, the IEEE-488 standard, the IEEE-802.X set of standards, the RS-232 standard, and other known serial and/or parallel communications protocols.

Figure 3:
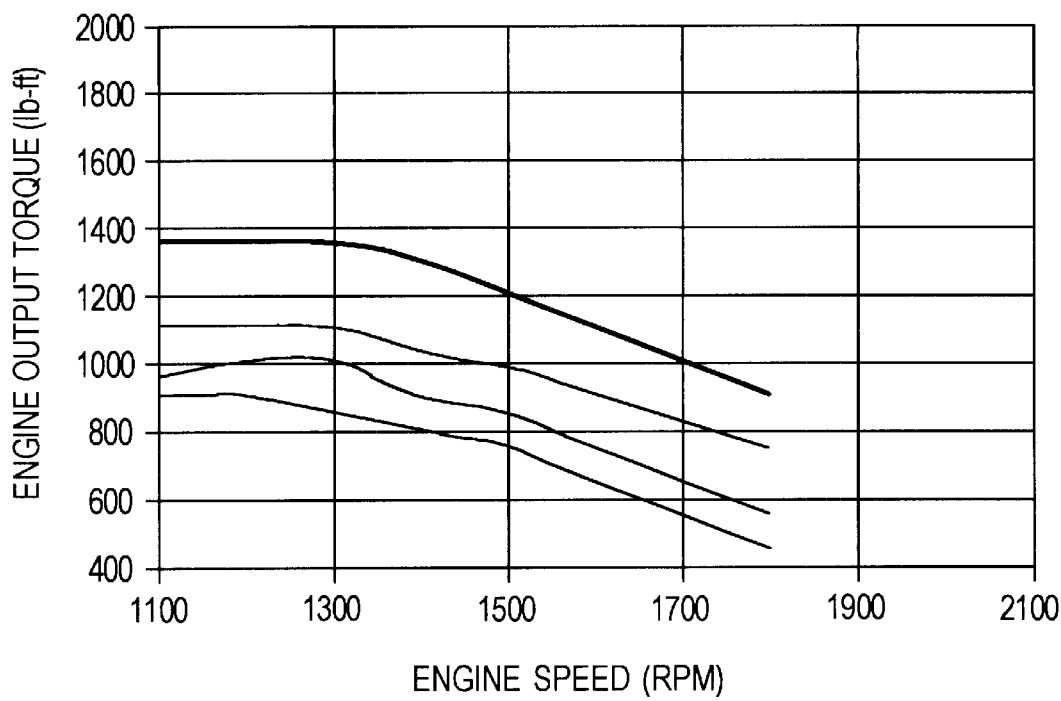
FIG. 3 is the graph of a torque curve for one illustrative internal combustion engine, the operation of which may be synchronized with other internal combustion engines, in accordance with the present invention.

Turning to FIG. 3, one illustrative embodiment of a torque map for master engine 23 is shown where the engine speed in revolutions per minute (RPM) is depicted on the horizontal axis and engine output torque in pound-feet (lb.-ft.) is depicted on the vertical axis. The upper most graph line in FIG. 3 represents the torque curve for engine 33 corresponding to 100% deliverable torque. The lines below the torque curve represent 80% torque, 70% torque and 65% torque, respectively.

Figure 4:
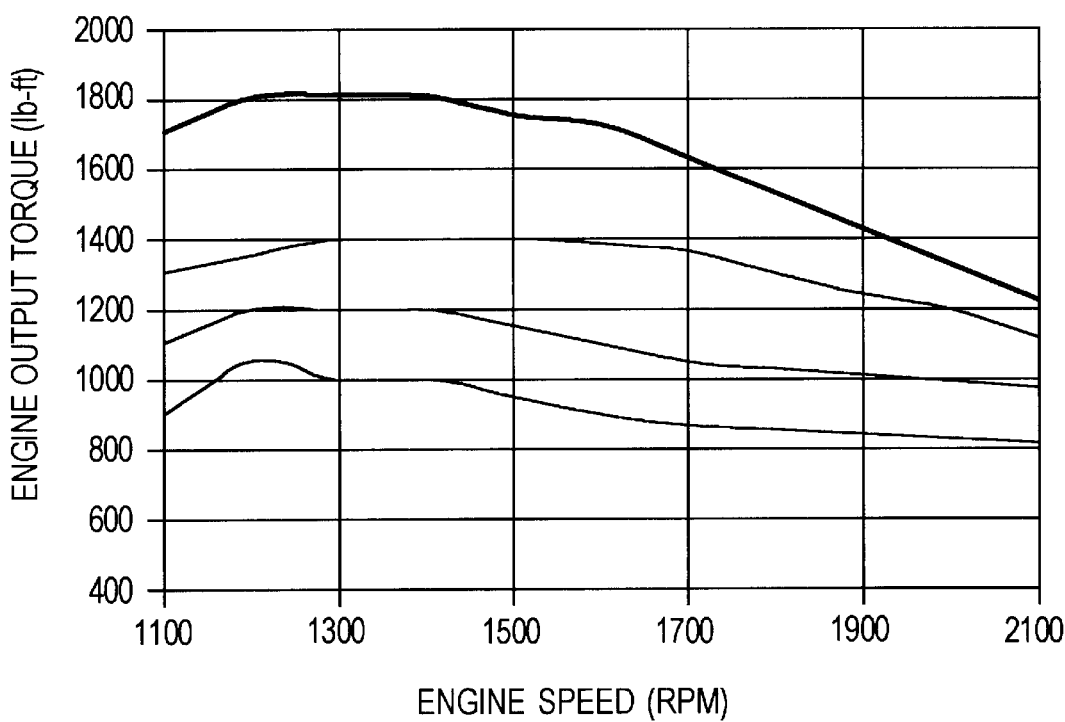
FIG. 4 is the graph of a torque curve for another illustrative internal combustion engine, the operation of which may be synchronized with other internal combustion engines, in accordance with the present invention.

Turning to FIG. 4, one illustrative embodiment of a torque map for slave engine 33 are shown where the engine speed in revolutions per minute (RPM) is depicted on the horizontal axis and engine output torque in pound-feet (lb.-ft.) is depicted on the vertical axis. Similar to FIG. 3, the upper most graph line in FIG. 4 represents the torque curve for engine 33 corresponding to 100% deliverable torque, and the lines below the torque curve represent 80% torque, 70% torque and 65% torque, respectively.

Returning to FIG. 2, the description of the control and communications functions implemented in the embodiment will now be described. As is known in the art, data regarding the fueling, power, torque, and other characteristics of engine 23 is programmed into control computer 21. The data also includes a fueling algorithm and a torque map, such as the torque map shown in FIG. 3.

In order to manipulate the output torque of engine 23, a torque request signal is provided by torque request mechanism 50 to control computer 21. Torque request mechanism 50 may be an accelerator pedal, a cruise control system (not shown), or another type of throttle control.

In one preferred embodiment, the provided torque request signal represents a percentage value corresponding to percent pedal deflection. Control computer 21 includes an engine speed governor (not shown), which correlates the torque request signal to a reference engine speed value. The engine speed governor calculates a fueling command value as a function of the calculated reference engine speed and the current actual engine speed, as provided by sensor 24. This fueling value is selected so as to drive the engine speed error (reference engine speed—actual engine speed) to zero. The fueling signal is provided by control computer 21 to fuel system 22, which responds by decreasing, maintaining, or increasing the amount of fuel supplied to engine 23 accordingly.

The size of the speed error and the terrain generally dictate the engine load, which is equal to (maximum fueling—current fueling)/maximum fueling. The engine load and the engine speed dictate the output torque produced by engine 23.

Control computer 21 communicates with various system components via network segment 29 by sending and receiving network messages. Some examples of these network messages are engine speed messages, vehicle speed messages, gear ratio messages, engine load messages, and the like. For example, in one preferred embodiment, control computer 21 calculates the current percent torque output of engine 23 as being the percentage of engine output torque relative to the torque curve (maximum deliverable torque) under current engine load and engine speed conditions. Control computer 21 broadcasts messages indicative of the percent torque output of engine 23 over network segment 29. These percent torque output messages may be received by any device operatively coupled to network segment 29, and used as desired. For example, transmission control computer 25 may use the percent torque output values contained in these messages to control automated gear selection. Broadcasting messages such as percent torque output over a CAN is known in the art.

Turning now to control computer 31, in one preferred embodiment it operates in a manner similar to control computer 21. Control computer 31 is programmed with data regarding engine 33, including a fueling algorithm and a torque map, illustratively the torque map shown in FIG. 4. Control computer 31 receives a torque request command and provides a fueling signal based partially thereon to fuel system 32, in a manner like that described above for control computer 21. Control computer 31 calculates the percent torque output of engine 33 and broadcasts messages indicative thereof over network segment 39.

However, unlike control computer 21, control computer 31 does not receive a torque request from torque request mechanism 50. Rather, in accordance with the present invention, control computer 31 receives a torque request command from control computer 21 via a control system, described herein as synchronizer 40. The term "synchronizer" as used herein indicates a device having controller functionality, and is not limited any particular type of controller, or to any particular control parameters.

In one preferred embodiment, synchronizer 40 reads information regarding the current status of engines 23 and 33, calculates a torque request command representing a desired torque output percentage for engine 33, and provides this torque request command to control computer 31. This torque request command can be provided one of two means. First, it could be transmitted via network segment 39 as a torque request message, which is a digital message sent in accordance with the particular message format implemented in network 39. This means is shown as the solid signal path between synchronizer 40 and network segment 39. Second, the torque request command can be provided as a torque request signal, in the same manner as described above in relation to control computer 31. This means is shown as the dashed signal path between synchronizer 40 and control computer 31. In the description that follows, the term "torque request command" is understood include each of these alternatives, and it will be obvious to those skilled in the art how to implement either alternative.

Figure 5:
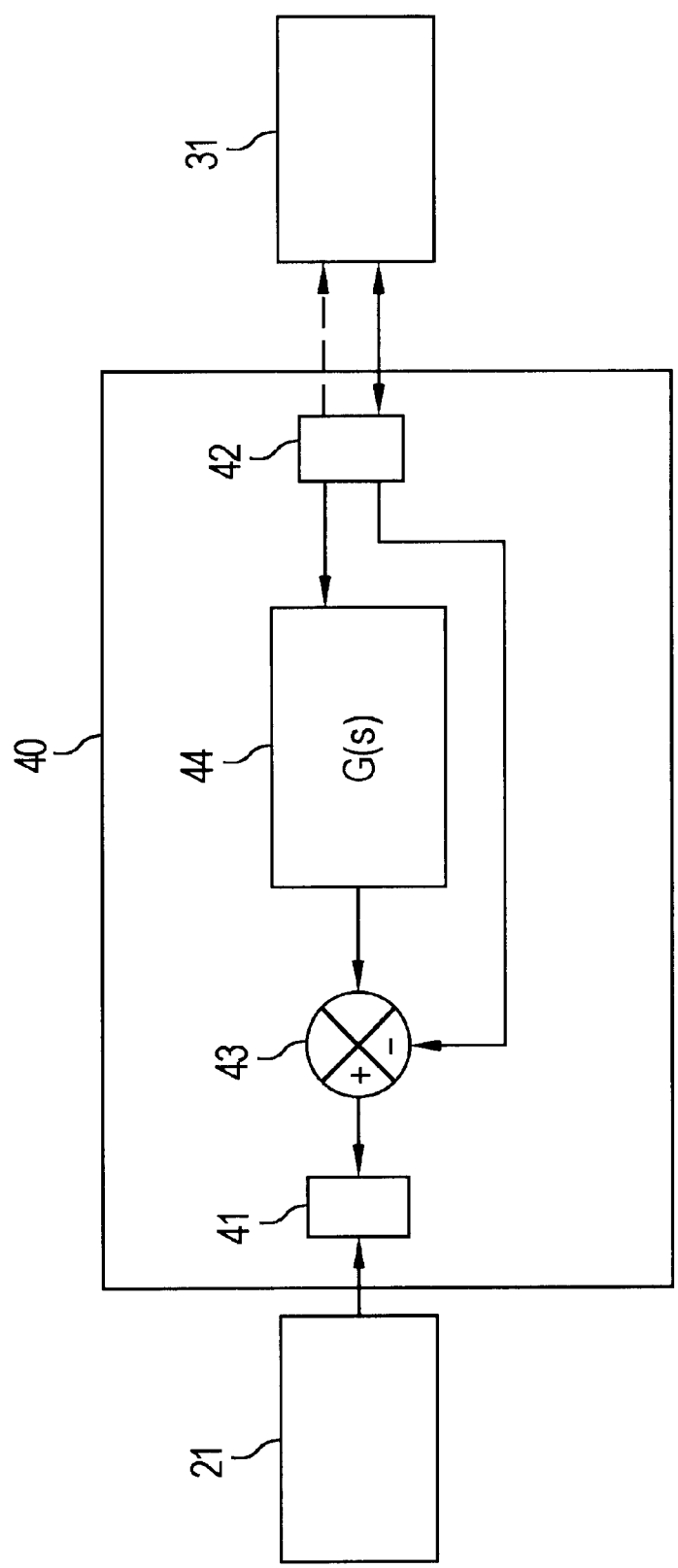
FIG. 5 is a functional block diagram illustrating one preferred embodiment of a synchronizer for synchronizing operation of a plurality of internal combustion engines, in accordance with the present invention.

Turning to FIG. 5, a block diagram representing an illustrative embodiment of synchronizer 40 is shown. It is important to note that most control area networks only support communications for one engine and its related subsystem, so it would not be advisable to directly connect two network segments, such as network segments 29 and 39. Therefore, in one preferred embodiment, synchronizer 40 contains one communications port 41 for connection to network segment 29 and one communications port 42 for connection to network segment 39 and to control computer 31. Communications ports 41 and 42 allow synchronizer 40 to receive all messages being transmitted via network segments 29 and 39, irrespective of the origin of a message. Communications port 42 also allows synchronizer 40 to provide a torque request command to control computer 31.

It will be obvious to those skilled in the art that the number and configuration of the communications ports is not significant, but rather it is the functions which these ports perform that is important. For example, the two communication functions described herein as provided by port 42 could alternatively be performed by two distinct ports. For further example, all communications functions could alternatively be performed by a single port.

It will also be obvious to those skilled in the art that a CAN supporting communications for more than one engine and its related subsystem is possible. In such a CAN, synchronizer 40 would contain one communications port for connection to a single network segment coupled to control computers 21 and 31. This single communications port would allow synchronizer 40 to receive all messages being transmitted via the single network segment, including messages originating from control computers 21 and 31. Again, the number and configuration of the communications ports is not significant, but rather it is the functions that these ports perform that is important.

In the embodiment of synchronizer 40 shown FIG. 5, synchronizer 40 is essentially a closed-loop controller. Control computer 21 produces a first percent torque value corresponding to the torque output percentage of engine 23. Control computer 31 produces a second percent torque value corresponding to the torque output percentage of engine 33. Synchronizer 40 receives these first and second torque values and computes an error value based on a difference therebetween. A torque request block 44 is responsive to the error value to produce a torque request command, which is provided to control computer 31. Control computer 31 is responsive to the torque request command provided by synchronizer 40 to compute a corresponding fueling signal for fueling engine 33, in the same manner described with respect to control computer 21 and engine 23, such that engine 33 produces the percent torque output corresponding to the torque request command. In one embodiment, synchronizer 40 is configured such that the torque request command produced thereby drives the percent torque error to zero; i.e. such that the second percent torque value produced by control computer 31 is controlled to match the first percent torque value produced by control computer 21.

In operation, control computer 21 receives a torque request signal and provides a corresponding fueling signal as described above. Control computer 21 calculates a first percent torque value corresponding to the torque output percentage of engine 23, and broadcasts a first percent torque message representative thereof via network segment 29. Control computer 31 calculates a second percent torque value corresponding to the torque output percentage of engine 33, and broadcasts second percent torque message representative thereof via network segment 39.

Synchronizer 40 receives the first percent torque message from control computer 21 via communications port 41. Synchronizer 40 receives the second percent torque message from control computer 31 via communications port 42. Summer 43 subtracts the second percent torque message from the firsts percent torque message and produces a torque error value as the difference therebetween. Torque request block 44 includes a transfer function that is utilized to calculate a torque request command for control computer 31 based on the torque error value. It will be obvious to those skilled in the art that a variety of transfer functions could be utilized by torque request block 44, such as a Proportional-Integral-Differential (PID) or other known controller function. Synchronizer 40 provides the torque request command to control computer 31 via communications port 42.

Control computer 31 is responsive to the torque request command provided by synchronizer 40 to calculate a fueling signal, and to provide the fueling signal to fuel system 32, as described above. Fuel system 32 responds to the fueling signal by decreasing, maintaining, or increasing the amount of fuel supplied to engine 33, accordingly.

One design implementation-specific design goal of synchronizer 40 should be the minimization of the force exerted by driven trailer 13 on portions of the vehicle positioned forward thereof. In other words, driven trailer 13 should not "push" too hard, or the vehicle could become unstable. Therefore, the relative power output characteristics of the engines 23 and 33 in multiple trailer road train vehicle 10 are significant.

There are three possibilities for the relative engine output characteristics. Engine 23 could have power output capabilities that are greater than, less than, or equal to those of engine 33. Where engine 23 has power output characteristics that are either greater than or equal to those of engine 33, implementation of synchronizer 40 with the controller function 44 described above is adequate.

However, in an illustrative embodiment where engine 23 has power output characteristics that are less than those of engine 33, a different control approach may be required. This approach requires synchronizer 40 to utilize the absolute torque output values for engines 23 and 33 in order to insure vehicle 11 remains stable. One approach is to calculate transfer function 44 so that engine 33 produces the same absolute torque as engine 23, or, in other words, to normalize the output power of engine 33 to that of engine 23.

Figure 6:
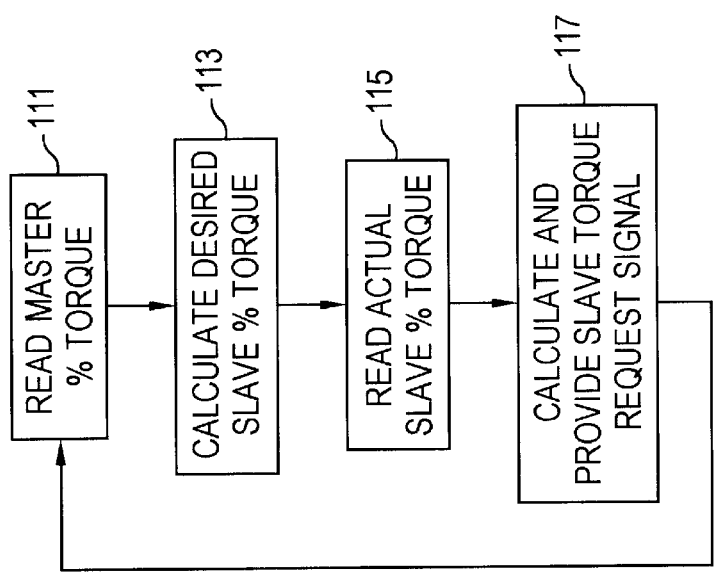
FIG. 6 is a flow chart illustrating one embodiment of a software algorithm for synchronizing operation of a plurality of internal combustion engines, in accordance with the present invention.

This normalization method can be implemented as shown in FIG. 6. In step 111, synchronizer 40 reads the current percent torque output message from network segment 29, which represents the current percent torque output of engine 23. In step 113, synchronizer 40 calculates the desired percent torque output for engine 33.

The desired percent torque output of engine 33 is equal to (Current Percent Torque Output of Mater Engine)× (Maximum Output Torque of Master Engine÷Maximum Output Torque of Slave Engine). In this equation, engine 23 is the master engine and engine 33 is the slave engine. From FIGS. 4 and 5 above, the Maximum Output Torque of Slave Engine is 1850 lb.-ft and the Maximum Output Torque of Master Engine is 1350 lb.-ft. This ratio will be a constant for any given master/slave engine combination. In this illustrative example the ratio is 0.7297297. So, for example, if the current percent torque output of master engine 23 is equal to 65%, the desired slave engine 33 percent torque output calculated in step 113 would be (0.7297297)×(65%), or 47.43%.

In step 115, synchronizer 40 reads the current percent torque output message from network segment 39, which represents the current percent torque output of engine 33. In step 117, synchronizer 40 calculates the slave engine torque request command and provides it to control computer 31, using a simple controller function, such as the one shown in FIG. 5 and described above. However, unlike the description accompanying FIG. 5, here the desired slave engine 33 percent torque output is used as a controlling parameter, in lieu of the actual master engine 23 percent torque output. After step 117, synchronizer 40 returns to step 111.

Figure 7:
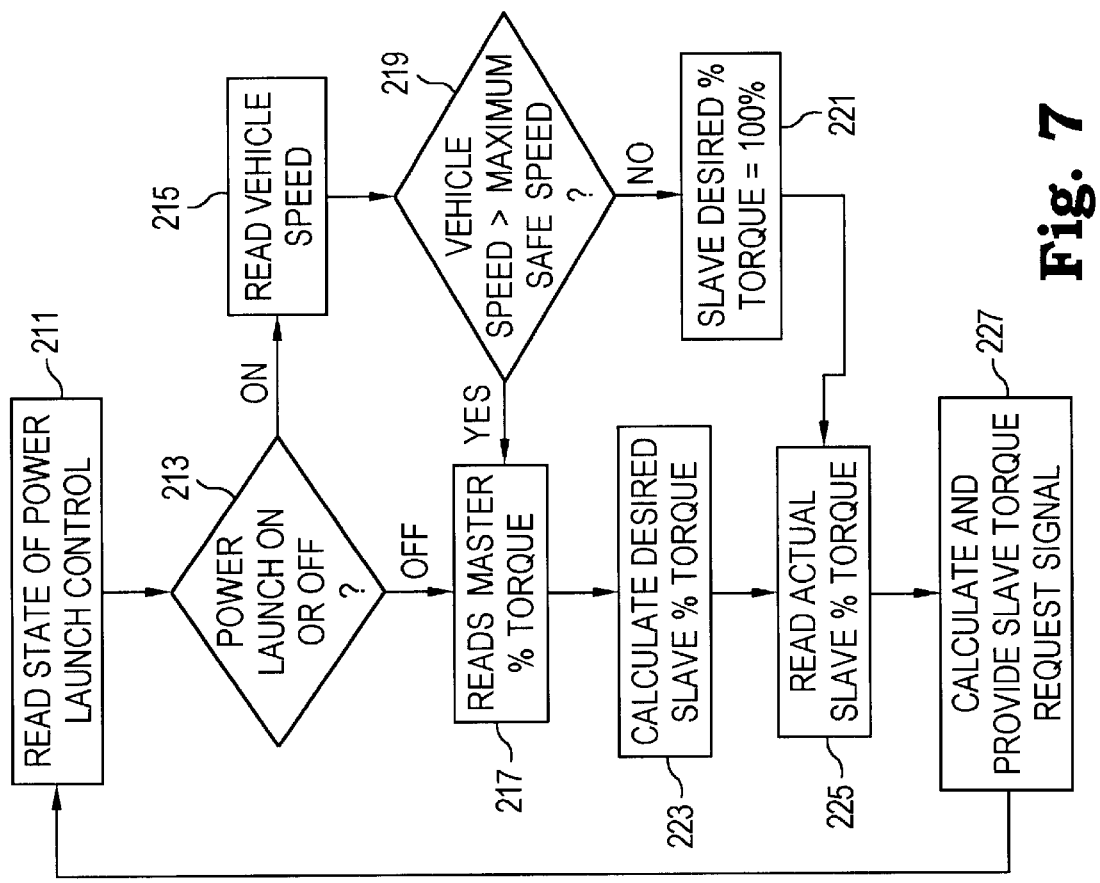
FIG. 7 is a flow chart illustrating another embodiment of a software of the algorithm for synchronizing operation of a plurality of internal combustion engines, in accordance with the present invention.

In FIG. 7, another illustrative embodiment, a variation of the normalization method shown in FIG. 6, is shown. In this illustrative embodiment, a power launch feature is added. This feature would be useful, for example, where transmission 25 is a manual transmission and transmission 35 is an automatic transmission. As the operator manually shifts the gears of transmission 25 during launch, and correspondingly depresses and releases torque request mechanism 50, the percent torque output of engine 23 will vary wildly. In the embodiment shown in FIG. 6, synchronizer 40 would provide torque request commands to control computer 31 that match these wildly fluctuating torque outputs. To compensate for these rapidly varying percent torque output messages, a "power launch" binary control (not shown) may be provided. The power launch control has two states, "on" and "off". It will be obvious to those skilled in the art that there are several known means by which the power launch control could be implemented, such as a single-throw single-pole switch or a momentary switch combined with a simple state machine, among others.

In step 211 synchronizer 40 reads the state of the power launch control. In step 213, synchronizer 40 branches to either step 215 or 217 depending on whether the power launch control is "on" or "off", respectively. If the power launch control is "on", synchronizer 40 calculates or reads the speed of vehicle 10 at step 215, in a known fashion. In step 219, synchronizer 40 then compares the vehicle speed to a predetermined maximum safe vehicle speed. At 219 synchronizer 40 then branches to either 217 or 221 depending on whether the vehicle speed is above or below the predetermined maximum safe vehicle speed, respectively. If it is below, then at step 221 synchronizer 40 sets slave engine 33 desired percent torque output to be 100%. Synchronizer 40 then proceeds to step 225.

If the power launch control is "off", or the power launch control is "on" and the vehicle speed is above the maximum safe vehicle speed, then at step 217 synchronizer 40 reads the current percent torque output message from network segment 29 as described above. In step 223, synchronizer 40 calculates the desired percent torque output for slave engine 33. In step 225, synchronizer 40 reads the current torque output message from network segment 39. In all cases, at step 227 synchronizer 40 calculates a torque request command and provides it to control computer 31. After step 227, synchronizer 40 returns to step 211.

Other variations could also be made without departing from the scope of the invention. For example, it will be obvious to those skilled in the art that the power launch feature could easily be implemented in the embodiment of synchronizer 40 described above in reference to FIG. 5. For another example, the algorithm implemented in synchronizer 40 could determine whether slave engine 33 is required for efficient operation, and decrease fueling to it in order to improve efficiency as required.

Furthermore, the illustrative embodiment described herein includes only two engines, but the present invention could be modified to support any number of engines, N, by providing a synchronizer 40 with N communications ports for connection to N associated network segments. In embodiments containing more than two engines, there will be one engine 23 which serves as the master engine, with the remaining one or more engines 33 serving as slave engines.

It will also be obvious to those skilled in the art that the messages utilized as the inputs to synchronizer 40 could be other than those described herein. For example, brake mean effective pressure messages could be used in lieu of torque output percent messages as the inputs for transfer functions, for algorithms, or for combinations of the two. In this embodiment, synchronizer 40 is operable to control the brake mean effective pressure of engine 33 to match that of engine 23. Engine manufacturers provide engines with CANs that contain a wealth of dynamic information regarding engine operating status, and countless combinations of input messages and control functions could be implemented without departing from the scope of the present invention.

In one preferred embodiment synchronizer 40 is a discrete component, coupled with master engine control computer 21 and slave engine control computer 31. However, the functionality of synchronizer 40 could be contained entirely in master engine control computer 21, entirely in slave engine control computer 31, or apportioned between the two. For example, master control computer 21 could contain the circuitry and/or software necessary to implement any embodiment of synchronizer 40 described herein. In this embodiment, master control computer 21 would contain an additional communications port for transmitting and, if a feedback system is implemented, receiving data to and from slave control computer 31. The interface between control computers 21 and 31 could be compliant with the SAE J1939 standard, the SAE J1587 standard, the IEEE-488 standard, the IEEE-802.X set of standards, the RS-232 standard, and other known serial and/or parallel communications protocols.

Alternatively, slave control computer 31 could contain the circuitry and/or software necessary to implement any embodiment of synchronizer 40 described herein, and, if necessary, an additional communications port for receiving data from master control computer 21. The interface between control computers 21 and 31 could be compliant with any known serial and/or parallel communications protocols, such as those listed in the preceding paragraph. It will be obvious to those skilled in the art of engine control computer design, with the aide of this specification, how to construct an embodiment of the present invention wherein the functionality of synchronizer 40 is contained entirely in master engine control computer 21, entirely in slave engine control computer 31, or apportioned between the two.

All of the illustrative embodiments described herein are exemplary, and are not intended to limit the claimed invention in any way.

What is claimed is:

1. A control system for use with at least a first engine producing a first torque and second engine producing a second torque, the control system comprising an interface between a first control computer associated with the first engine and a second control computer associated with the second engine, the first control computer controlling the second control computer through the interface such that the second torque is a function of the first torque;

wherein the first engine has a first maximum torque output associated therewith, the interface receives a first percent torque message indicating a first percentage that equals the first torque divided by the first maximum torque, generates a torque request message indicating a requested torque value indicating a requested torque to be produced by the second engine that is a function of the first percentage, and transmits the torque request message to the second control computer.

2. The control system of claim 1, wherein the second engine has a second maximum torque output associated therewith, the interface receives a second percent torque message indicating a second percentage that equals the second torque divided by the second maximum torque output, and the requested torque value is further a function of the second percentage.

3. A control system for use with at least a first engine producing a first torque and second engine producing a second torque, the control system comprising an interface between a first control computer associated with the first engine and a second control computer associated with the second engine, the first control computer controlling the second control computer through the interface such that the second torque is a function of the first torque;

wherein the interface receives a first message indicating a first value from the first control computer, receives a second message indicating a second value from the second control computer, calculates an error value indicating the difference between the first and second values, and calculates a requested torque value indicating a requested torque to be produced by the second engine to cause the error value to approach zero.

4. The control system of claim 3, wherein the interface transmits a torque request message indicating the requested torque value to the second control computer.

5. The control system of claim 3, wherein the interface provides a torque request signal indicating the requested torque value to the second control computer.

6. The control system of claim 3, wherein the first value indicates a percentage that equals the first torque divided by the first maximum torque output.

7. The control system of claim 3, wherein the first value indicates a brake mean effective pressure produced by the first engine.

8. The control system of claim 3, wherein the first control computer is coupled to a first network, the second control computer is coupled to a second network, and the interface is coupled between the first and second networks.

9. A control system for synchronizing operation of a plurality of internal combustion engines, comprising:

a first control computer associated with a first internal combustion engine, the control computer producing a first datum; and a second control computer associated with a second internal combustion engine; and an interface operatively coupled between the first and second control computers, the interface responsive to the first datum to provide an operational command to the second control computer, the second control computer responsive to the operational command to control the second engine so that a first relationship exists between a second torque produced by the second engine and a first torgue produced by the first engine;

wherein the first internal combustion engine has a first maximum torque output associated therewith, the first datum indicates a first percentage that equals the first torque divided by the first maximum torque output.

10. The control system of claim 9, wherein the second internal combustion engine has a second maximum torque output associated therewith, the second control computer produces a second datum indicating a second percentage that equals the second torque divided by the second maximum torque output, and the interface is further responsive to the second datum to provide the operational command to the second control computer so that the first relationship is further a function of the second percentage.

11. A control system for synchronizing operation of a plurality of internal combustion engines, comprising:

a first control computer associated with a first internal combustion engine, the control computer producing a first datum; and a second control computer associated with a second internal combustion engine; and an interface operatively coupled between the first and second control computers, the interface responsive to the first datum to provide an operational command to the second control computer, the second control computer responsive to the operational command to control the second engine so that a first relationship exists between a second torque produced by the second engine and a first torgue produced by the first engine; wherein the first datum indicates a first value, the second control computer produces a second datum indicating a second value, and the interface is responsive to the first and second data to produce an error value indicating the difference between the first and second values and to calculate a requested torque value indicating a requested torque to be produced by the second internal combustion engine to cause the error value to approach zero.

12. The control system of claim 11, wherein the operational command comprises a torque request message indicating the requested torque value.

13. The control system of claim 11, wherein the operational command comprises a torque request signal indicating the requested torque value.

14. The control system of claim 11, wherein the first engine has a maximum torque output associated therewith, and the first value indicates a percentage that equals the first torque divided by the maximum torque output.

15. The control system of claim 11, wherein the first value indicates a brake mean effective pressure produced by the first engine.

16. The control system of claim 11, wherein the first control computer is coupled to a first network, the second control computer is coupled to a second network, and the interface is coupled between the first and second networks.

17. The control system of claim 11, wherein the interface is operatively coupled to a selector having at least a first and a second state, wherein the first relationship exists between the first torque and the second torque when the selector is in the first state, and a second relationship exists between the first torque and the second torque when the selector is in the second state.

18. A control system for use with at least a first engine producing a first torque and a second engine producing a second torque, the control system comprising:

first control computer configured to compute a first fueling signal;

a first fueling system responsive to the first fueling signal to supply a corresponding quantity of fuel to the first engine;

a second control computer configured to compute a second fueling signal;

a second fueling system responsive to the second fueling signal to supply a corresponding quantity of fuel to the second engine; and an interface operatively coupled between the first and second control computers, the interface responsive to a first datum from the first control computer to provide an operational command to the second control computer, the second control computer responsive to the operational command to compute the second fueling signal so that the second torgue is a function of the first torgue; wherein the first engine has a first maximum torque output associated therewith, and the first datum indicates a first percentage that equals the first torque divided by the first maximum torque output.

19. The control system of claim 18, wherein the second engine has a second maximum torque output associated therewith, the second control computer produces a second datum indicating a second percentage that equals the second torque divided by the second maximum torque output, and the interface is further responsive to the second datum to provide the operational command to the second control computer so that the second torque is further a function of the second percentage.

20. A control system for use with at least a first engine producing a first torgue and a second engine producing a second torgue, the control system comprising:

a first control computer configured to compute a first fueling signal;

a first fueling system responsive to the first fueling signal to supply a corresponding guantity of fuel to the first engine;

a second control computer configured to compute a second fueling signal;

a second fueling system responsive to the second fueling signal to supply a corresponding guantity of fuel to the second engine; and an interface operatively coupled between the first and second control computers, the interface responsive to a first datum from the first control computer to provide an operational command to the second control computer, the second control computer responsive to the operational command to compute the second fueling signal so that the second torgue is a function of the first torgue; wherein the first datum indicates a first value, the second control computer produces a second datum indicating a second value, and the interface is responsive to the first and second data to produce an error value indicating the difference between the first and second values and to provide the operational command such that the error value approaches zero.

21. The control system of claim 20, wherein the operational command is a torque request message.

22. The control system of claim 20, wherein the operational command is a torque request signal.

23. The control system of claim 20, wherein the second engine has a second maximum torque output associated therewith, and the first value indicates a percentage that equals the first torque divided by the maximum torque output.

24. The control system of claim 20, wherein the first value indicates a brake mean effective pressure produced by the first engine.

25. The control system of claim 20, wherein the first control computer is coupled to a first network, the second control computer is coupled to a second network, and the interface is coupled between the first and second networks.

26. An apparatus for controlling a first torque output of a first engine having a first electronic control module that produces a first control signal to control a first fueling system associated with the first engine, and a second torque output of a second engine having a second electronic control module that produces a second control signal to control a second fueling system associated with the second engine, the apparatus comprising:

an input port coupled to the first electronic control module to receive a reference datum from the first electronic control module, the reference datum correlating to the first torque output, a feedback port coupled to the second electronic control module to receive a feedback datum from the second control module, the feedback datum correlating to the second torque output, an output port coupled to the second electronic control module, and a controller coupled to the input, feedback, and output ports, the controller responsive to the reference datum and the feedback datum to generate an output signal that is indicative of changes to be made to the at least one second control signal in order for the second torque output to match the first torque output, the controller transmitting the output signal to the second electronic control module via the output port.

27. The apparatus of claims 26, wherein the controller is configured to subtract the feedback datum from the reference datum to produce a difference signal, and to process the difference signal to generate the output signal.

* * * * *